Patented Sept. 2, 1924.

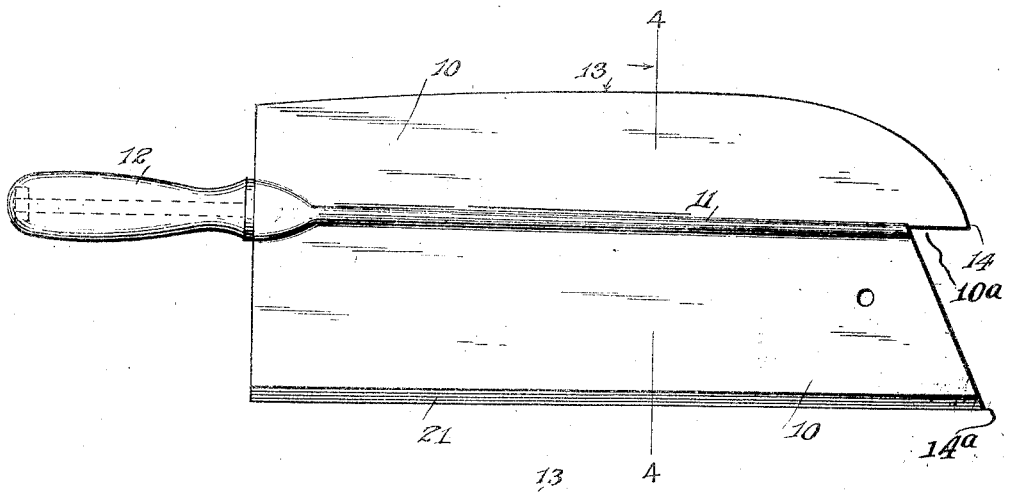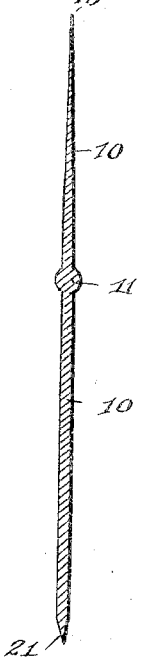

1,507,526

UNITED STATES PATENT OFFICE.

JOHN STRAUB, OF ASHLEY, NORTH DAKOTA.

COMBINATION IMPLEMENT.

Application filed April 28, 1923. Serial No. 635,299.

*To all whom it may concern:*

Be it known that I, JOHN STRAUB, a citizen of the United States, residing at Ashley, in the county of McIntosh and State of North Dakota, have invented certain new and useful Improvements in Combination Implements, of which the following is a specification.

This invention relates to combination implements, and has for one of its objects to provide a device of this character, in which a severing blade and a slicing blade are coactively coupled.

With these and other objects in view, the invention consists in certain novel features of construction as hereinafter shown and described and then specifically pointed out in the claim, and in the drawings illustrative of the preferred embodiment of the invention—

Fig. 3 is a view similar to Fig. 1, illustrating a modification of the construction.

Fig. 4 is a transverse section on the line 4—4 of Fig. 2, looking in the direction of the arrow.

Figure 1:
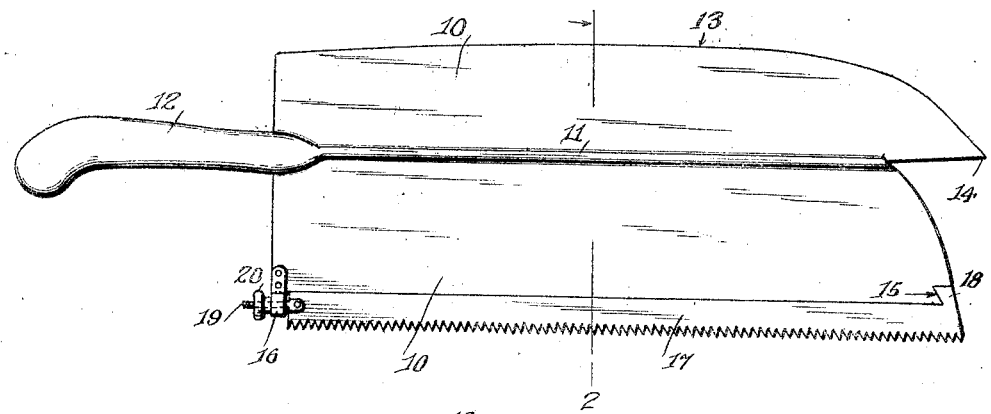
Figure 1 is a side elevation of the improved implement in one of its forms.

The improved device comprises a body or stock of relatively thin steel and represented as a whole at 10, and with an integral reinforcing rib 11 extending longitudinally thereof intermediate the edges. A fixed handle 12 extends from one end of the body in alinement with the rib 11. The body 10 has one end, the forward end, formed with a substantially triangular cutaway portion 10ª to provide a pair of spaced points 14 and 14ª respectively, substantially in alignment transversely of the blade and extending in the same direction, as shown. Each edge of the body is sharpened to provide a cutting edge, the point 14 being at the terminus of the cutting edge 13 which is curved at the outer end, as shown, and provides a severing or slicing edge or blade. The other edge of the body is straight and terminates at the forward end at the point 14ª, providing a cleaver or severing edge 21. These edges 13 and 21 are substantially parallel, and the forward points of each is free and uncovered at all times so that they might be used together as a tenderer by holding the body vertical and jabbing the points into a body of meat.

Figure 2:
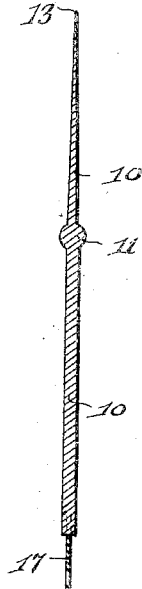
Fig. 2 is a transverse section on the line 2—2 of Fig. 1, looking in the direction of the arrow.

In Figs. 1 and 2, the edge of the body opposite to the cutting or knife edge is continuous throughout except at one end, for instance, the one farthest from the handle 12, where an undercut socket 15 is formed, and a clip 16 attached to the other end.

A severing blade member 17 preferably with saw teeth bears by its inner edge against the confronting edge of the body 10 and is formed with an overhanging lug 18 to engage in and closely fit the socket 15, as shown.

A straining screw 19 is attached at 20 to the blade, and extends through the clip 16 and is provided with a milled nut 20 or the like.

By this means the saw 17 may be firmly supported on the body 10 and strained longitudinally to hold it in place, while at the same time it can be easily removed and replaced as required.

By furnishing a plurality of the saw blades with each body, a newly filed blade may be quickly substituted for a dull blade, and thus obviating the delay of waiting for a blade to be filed.

The edge of the portion of the body opposite to the knife edged portion may also be sharpened as shown at 21 to constitute an efficient cleaver.

The improved device provides for two full length blades, is simple in construction, can be inexpensively manufactured and be very useful to dealers in meats and the like, for use in hotels, boarding houses, and families, and may be constructed to suit the conditions in which it will be employed.

Having thus described the invention, what is claimed as new is:—

A tool for the purpose set forth comprising a substantially wide blade having a slicing edge and a severing edge, and a fixed handle extending from one end of the blade, said blade having its other end formed with a substantially triangular cutaway portion to provide a pair of unguarded spaced points projecting in the same direction and to further provide two full substantially equal length edges, one of said points at the outer terminus of the slicing edge and the other at the outer terminus of the severing edge, said points arranged substantially in transverse alignment with respect to the blade and, together, being adapted for use as a meat tenderer.

In testimony whereof, I affix my signature hereto.

JOHN STRAUB.